United States Patent
Banerjee et al.

(10) Patent No.: US 6,245,315 B1
(45) Date of Patent: Jun. 12, 2001

(54) PROCESS FOR THE PRODUCTION OF HIGH DENSITY HYDRATION RESISTANT LIME SINTER

(75) Inventors: Gautam Banerjee; Samir Kumar Das; Arup Ghosh; Barundeb Mukherjee; Jnan Ranjan Biswas, all of Calcutta; Sachi Dulal Majumdar, Thane; Deepak Gangadhar Banawalikar, Thane; Sarbapi Mukherjee, Thane, all of (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 09/489,065

(22) Filed: Jan. 21, 2000

(30) Foreign Application Priority Data

Mar. 19, 1999 (IN) .............................................. 444/DEL/99

(51) Int. Cl.[7] .......................... C01B 13/14; C01F 11/02; C01F 5/02; C01F 5/14
(52) U.S. Cl. ......................... 423/640; 423/637; 423/275; 502/340
(58) Field of Search .................................. 423/634, 640, 423/275; 502/340

(56) References Cited

U.S. PATENT DOCUMENTS

| | | | |
|---|---|---|---|
| 2,894,820 | * | 7/1959 | Rikard et al. ............................ 23/188 |
| 3,516,808 | * | 6/1970 | Curran et al. ............................ 48/197 |
| 3,630,504 | * | 12/1971 | Reynolds ............................ 263/53 R |
| 3,839,551 | * | 10/1974 | Dozsa et al. ............................ 423/640 |
| 4,089,669 | * | 5/1978 | Sawyer, Jr. ............................ 71/11 |
| 4,330,514 | * | 5/1982 | Nagai et al. ............................ 423/309 |
| 4,382,911 | * | 5/1983 | Pennell et al. ............................ 423/175 |
| 4,636,379 | * | 1/1987 | Bestek et al. ............................ 423/640 |
| 5,223,239 | * | 6/1993 | Moran et al. ............................ 423/640 |
| 5,277,837 | * | 1/1994 | Dumont et al. ............................ 252/190 |
| 5,332,436 | * | 7/1994 | Walker, Jr. et al. ............................ 106/792 |
| 5,362,319 | * | 11/1994 | Johnson ............................ 106/705 |
| 5,492,685 | * | 2/1996 | Moran et al. ............................ 423/244.07 |
| 5,705,141 | * | 1/1998 | Dumont et al. ............................ 423/640 |
| 5,792,440 | * | 8/1998 | Huege ............................ 423/432 |
| 5,876,689 | * | 3/1999 | Webeling et al. ............................ 423/640 |
| 5,965,103 | * | 10/1999 | Golley et al. ............................ 423/640 |
| 6,074,521 | * | 6/2000 | Engdahl et al. ............................ 162/29 |

\* cited by examiner

*Primary Examiner*—Steven P. Griffin
*Assistant Examiner*—Cam N. Nguyen
(74) *Attorney, Agent, or Firm*—Ladas and Parry

(57) ABSTRACT

A process for the production of high density hydration resistant sintered lime which comprises washing limestone having impurities of less than 2% to remove external impurities, crushing the washed limestone to a size of 25 mm or below, calcining the limestone at a temperature in the range of 1000 to 1150° C. for a period in the range of 2 to 3 hours to form a calcined mass, hydrating the calcined mass, drying the hydrated mass by known methods, deagglomerating the dried hydrated mass with 1 to 4 weight percent of an additive selected from the group consisting of a transition metal oxide capable of forming a low melting compound, a rare earth metal oxide capable of forming a solid solution, and mixtures thereof, pelletizing the resultant mixture at a pressure of at least 1000 Kg/lcm$^2$, sintering the pellets at a temperature In the range of 1500° C. to 1650° C. for a period In the range of 24 hours and allowing the resultant sintered pellets to cool.

5 Claims, No Drawings

PROCESS FOR THE PRODUCTION OF HIGH DENSITY HYDRATION RESISTANT LIME SINTER

FIELD OF INVENTION

This invention relates to a process for the production of high density hydration resistant sintered lime. This invention particularly relates to a process for the production of high density hydration resistant sintered lime from relatively pure limestone or calcite containing less than 2% impurities. The sintered lime are prepared by the process of this invention useful as an intermediate raw material for the production of lime refractories which has a potential and large scale application as lining materials in kilns and furnaces in Steel and Cement Industries.

BACKGROUND OF THE INVENTION

The steel technology is rapidly changing with the introduction of bigger capacity Basic Oxygen Furnace, stringent conditions in ladle metallurgy with higher operating temperature. This needs superior quality basic refractories for high service performance. Magnesite and dolomite either tar or pitch bonded with graphite/carbon addition are traditionally used in these furnaces for achieving high slag corrosion resistance and superior refractory properties. Lime/calcia inspite of being strong contender of magnesite and dolomite is not used as a refractory material for its high tendency towards atmospheric hydration. When the refractoriness and thermodynamic stability in the presence of carbon is considered, lime would be even better refractory material than dolomite or magnesite in the steel making conditions. Non metallic inclusions are formed when an element dissolved in liquid steel reacts with refractory constituents like $SiO_2/Cr_2O_3$ etc. of lining. The other advantage of lime refractories is its resistance to these dissolved elements, and thus formation of non metallic inclusions is reduced and this ultimately helps to improve the cleanliness of steel. The advantages of lime is utilized in some other countries by comixing it with dolomite/magnesite in brick making or cosintering at an early stage. Pure lime refractory is not used due to its perishing tendency. Still the lime will be a potential refractory if highly dense lime is produced, with an excellent hydration resistance and stability.

The basic raw material for production of sintered lime is natural limestone. High purity limestone is easily available in India and other parts of the world. Since the refractoriness of lime is very high, sintering of lime requires a high temperature which is not usually available in the industries. Therefore, the achievement of good quality sintered lime from purer natural lime stone lump needs a temperature above 2000° C. The low flux lime stone (<2% impurity) generates favourable liquid phase above this temperature. Whereas, high flux limestone (>3% impurity) can be densified at a relatively lower temperature, but the product does not find use owing to its lower densification and low performance.

Reference may be made to the work of L. L. Wong and R. C. Bradt (1. Am. Ceram. Soc. Bull., 69 (7)1183–89 (1990) wherein it has been shown that impure limestone resulted poor densification at high firing temperature, 1600° C.

L. Xintian et. al (2. Brit. Ceram. Trans. 93 (4)150–153 (1994) tried to develop CaO sinter with improved hydration resistance by the addition of $Al_2O_3$. However, hydration resistance properties were inferior to the present work which is being reported herein.

Vezikova et. al (3. Refractories 33 (1–2)85–89 (1992) reported the development of lime sinters with the addition of $TiO_2$. The material was fired at 1750° C. which is much higher than the current work which is being sought to be protected.

Addink et. al (4. U.S. Pat. No. 4,795,725 (1989) developed a CaO refractory composition based on lime. To avoid hydration of lime Addink et. al used a thermosetting novolak type phenol resin in the batch so that it coates the CaO grains and prevent its hydration. The present work does not use any resin to protect the CaO grains.

Cassens (5. U.S. Pat. No. 4,463,100(1984)) developed a refractory material based on CaO by converting CaO into a different compound 2 CaO. $SiO_2$.

Neville et. al (6. U.S. Pat. No. 4,843,044 (1989)) developed a lime based refractory material which contained lime sinter along with monosodium phosphate and alkali metal polyphosphate. No such binder has been used in the work reported by us.

For the improvement in the densification and hydration resistance, it is necessary to introduce mineralizer or additive in a reactive lime. This will help sintering at relatively lower temperature which improve the quality of the product to a great extent.

OBJECT OF THE INVENTION

The main objective of the present invention is to provide a process for the production of high density hydration resistant lime sinter.

Another object is to use purer (less than 2% impurities) variety of limestone which will generate high quality sintered lime to provide maximum hydration resistance to atmospheric moisture.

Yet another objective of the present invention is to maximize the grain size and their homogenity in the matrix.

Still another objective is to provide a compact microstructure which will contain less number of pores, with uniform distribution in the grain matrix.

Another objective of the invention is to prepare sintered lime with relatively large grain size uniforming distributed in the matrix.

DETAILED DESCRIPTION OF THE INVENTION

Accordingly the present invention provides a process for the production of high density hydration resistant lime sinter, which comprises washing limestone having impurity of less then 2% to remove external impurities, if any, crushing the said washed limestone to a size 25 mm or below, calcining the limestone at a temperature in the range of 1000 to 1150° C. for a period in the range of 2 to 3 hours, hydrating the calcining mass, drying the hydrated mass by known methods, deagglomerating by known methods the dried hydrated mass, mixing to the said hydrated dried mass 1 to 4 weight percent additives such as transition metal oxides capable of forming low melting compound, rare earth metal oxides capable of forming solid solution, or mixture thereof, pelletizing the resultant mixture at pressure of at least 1000 Kg/cm$^2$, sintering the pellets so obtained at a temperature in the range of 1550 to 1650° C. for a period in the range of 2 to 4 hours and allowing the resultant sinter to cool naturally.

In an embodiment of the present invention the transition metal oxide additive used may be such as ferric oxide, titanium dioxide, cooper oxide, vanadium pentoxide or mixture thereof.

In another embodiment of the present invention the rare earth metal oxides additives used may be such as cerium oxide, lanthanum oxide or mixture thereof.

The hydration is minimized not only by achieving higher densification. Uniform grain growth is also needed to the extent as far as possible. Densification along with grain growth will make the lime grain more hydration resistant and slag resistant refractory. In the presence of highly basic and ferruginous slag magnesia is known to be comparatively better than calcia. If the grain size of calcia is sufficiently large, the slag & hydration resistant will be significantly improved. The sintered lime prepared by the process of the present invention possess relatively large grain size uniformly distributed in the matrix. This not only improves the resistance towards hydration but also improve the flexural strength at elevated temperatures.

Lime has a theoretical density of 3.32 gm/cc. Achievement of this density in case of a purer variety of limestone containing less than 2 percent impurity is extremely difficult at the commercially available calcination temperature.

Thus to achieve high densification at relatively lower temperature one has to start with reactive lime and thus the choice of precursor becomes very much important. In fact it has been found that hydroxide of lime produce much finer CaO grain than that received from carbonate of calcium. The natural lime stone which is the carbonate of calcium can be converted into hydroxide form by pre-calcination and followed by hydration of carbonate derived oxide. The precalcination temperature in the range of 1000 to 1150° C. is very much related to the characteristics of lime stone such as grain size, impurity content etc. The selection of precalcination temperature is primarily done from the knowledge of Differential Thermal Analysis peak. When decomposition of lime hydroxide occurs an enormous volume expansion takes place and results fine particles of CaO. The reactivity can be ascertained by measuring the specific surface area in relation to per-calcination temperature.

To achieve high densification the fine particles of hydroxides needs pelletization under high pressure either by pelletizing machine or under uniaxial pressure by hydraulic press machine at pressure varying from 1000 to 1500 kg/cm$^2$.

The pellets for briquetting machine was pillow shaped (20 mm×10 mm) and for hydraulic press the dimension is 25 mm×25 mm high. The pellets were then finally calcined at a temperature of 1450 to 1650° C.

In the double calcination process although densification is attained at relatively lower temperature (below 1650° C.), it is difficult to achieve substantial grain growth. Additives play an important role here to control the grain growth and are required to be incorporated in the reactive powder before pelletization. There are two different classes of additives which facilitate grain growth by different mechanisms. A group of additives favour grain growth by formation of low melting compound while another class of additives are effective by formation of defects as a result of solid solution. In the solid sate process the cation ($Ca^{2+}$) of lime is substituted by the cation of additive. According to valency difference, cation vacancy/defective structure will be created in the crystal lattice of lime. The lime sintering is thus enhanced at a much lower temperature due to excess stored energy in the vacant site of lime lattice. The disadvantage of liquid forming additive is, if added above certain amount the refractory property will be deteriorated. Moreover, liquid state sintering forms subrounded grains, which impairs the load bearing capacity at high temperature.

In double stage calcination process an additional low temperature calcination is required and the process requires little more energy for generation of reactive lime.

The sintered lime was characterized by determining three properties like (1) Bulk Density and Apparent Porosity (2) Hydration resistance and (3) Microstructure. Bulk density and apparent porosity were measured by xylene penetration method under vacuum and the porosity was measured in xylene using Archimedes principle. The hydration resistance property was determined by measuring the fine dust generated below 35 mesh Tyler in 95% relative humidity at 50° C. for a testing period of 3 hours. The sintered lime of grain size −5+10 BS mesh was subjected to this atmosphere in a humidity cabinet and the weight gain as well as fine dust as % weight loss was measured after the experiment. The grain size of lime and their size distribution were determined by evaluating microstructure under optical microscope. The experiment was carried out on the polished section of the sample. The grain size and their distribution were measured by an Image Analyser.

The invention will now be described with the help of the following examples for carrying out the process in actual practice. However, these examples should not be construed as to limit the scope of invention.

EXAMPLE—1

The limestone was thoroughly washed with water then crushed to 25 mm size, calcined at 1000° C. @ 5° C. /min with a soaking of two hours and cooled the calcined mass in the furnace. The sample was then hydrated by allowing the reaction of calcined mass with excess water for 12 hrs and then dried at 110° C. for 6 hours. The calcium hydroxide powder was briquetted at a pressure of 1000 kg/cm$^2$. The briquettes were dried and finally sintered at 1650° C. for 2 hours holding period. The firing temperature was raised @ 4° C./min. The result showed BD-3.12 gm/cc, apparent porosity of 0.8% and hydration loss of 1%. The average grain size of lime was 47 micron.

EXAMPLE—2

The limestone was washed and then crushed to 25 mm size, calcined at 1100° C. for 2 hours. The calcined mass was cooled by airquenching from 1100° C. to room temperature followed by hydration with water. The calcined hydrated limestone was briquetted at a pressure of 1200 Kg/cm$^2$, dried and finally sintered at 1650° C. for 2 hours. The bulk density achieved was 3.18 gm/cc with apparent porosity of 0.3% and hydration loss was 0.7%.

EXAMPLE—3

The limestone was washed and then crushed to 25 mm size, calcined at 1150° C. for 2 hours. The calcined mass was motor generated for 1150° C. The calcined hydrated limestone was briquetted at a pressure of 1500 kg/cm$^2$, dried and finally sintered at 1650° C. for 2 hours. The result obtained was bulk density—3.10 gm/cc with 2.4% apparent porosity and hydration loss of 1.7%.

EXAMPLE—4

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent titanium dioxide. Briquetting of the mixture was done under a pressure of 1200 Kg/cm$^2$, dried and finally sintered at 1600° C. for 3 hours. The bulk density achieved was 3.20 gm/cc with apparent porosity of 0.3% and hydration loss was 2.8%.

EXAMPLE 5

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent ferric oxide. Briquetting of the mixture was done under a pressure of 1200 Kg/cm$^2$, dried and finally sintered at 1600° C. for 3 hours. The bulk density achieved was 3.19 gm/cc with apparent porosity of 0.5% and hydration loss was 1.9%. The grain size was 149 micron.

EXAMPLE 6

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent lanthanum oxide. Briquetting of the mixture was done under a pressure of 1200 Kg/cm$^2$, dried and finally sintered at 1600° C. for 3 hours. The bulk density achieved was 3.20 gm/cc with apparent porosity of 0.3% and hydration loss was 2.5%. The grain size was 108 micron.

EXAMPLE 7

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent cerium oxide. Briquetting of the mixture was done under a pressure of 1200 Kg/cm$^2$, dried and finally sintered at 1600° C. for 3 hours. The bulk density achieved was 3.23 gm/cc with apparent porosity of 0.1% and hydration loss was 3.5%. The grain size was 95 micron.

EXAMPLE 8

Limestone was washed and then crushed to 25 mm size, calcined at 11000° C. for 2 hours and cooled the calcined mass in the furnace. The calcined mass was hydrated with water and then dried at 110° C. for 6 hours. The calcined hydrated limestone was mixed with 2 weight percent vanadium pentoxide. Briquetting of the mixture was done under a pressure of 1200 Kg/cm$^2$, dried and finally sintered at 1600° C. for 3 hours. The bulk density achieved was 3.05 gm/cc with apparent porosity of 0.4% and hydration loss was 3.8%. The grain size was 100 micron.

EXAMPLE 9

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent copper oxide. Briquetting of the mixture was done under a pressure of 1200 Kg/cm$^2$, dried and finally sintered at 1600° C. for 3 hours. The bulk density achieved was 3.08 gm/cc with apparent porosity of 0.3% and hydration loss was 2.1%. The grain size was 95 micron.

EXAMPLE 10

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent ferric oxide. Briquetting of the mixture was done under a pressure of 1200 Kg/cm$^2$, dried and finally sintered at 1450° C. for 15 hours. The bulk density achieved was 3.14 gm/cc with apparent porosity of 0.2% and hydration loss was 2.5%. The grain size was 155 micron.

EXAMPLE 11

Limestone was washed and then crushed to 25 mm size, calcined at 1100° C. for 2 hours and cooled the calcined mass in the furnace. The calcined mass was hydrated with water and then dried at 110° C. for 6 hours. The calcined hydrated limestone was mixed with 2 weight percent lanthanum oxide. Briquetting of the mixture was done under a pressure of 1200 Kg/cm$^2$, dried and finally sintered at 1600° C. for 3 hours. The bulk density achieved was 3.10 gm/cc with apparent porosity of 0.2% and hydration loss was 2.1%. The grain size was 129 micron.

EXAMPLE 12

Limestone was washed and then crushed to 25 mm size, calcined at 1100° C. for 2 hours and cooled the calcined mass was cooled by air quenching from 1100° C. to room temperature followed by hydration with water. The calcined hydrated limestone was briquetted under pressure 300, 500, 750, 1000, 1500, 2000 & 2500 Kg/cm$^2$. Briquettes were fired at 1650° C. for 2 hours. The fired density measured indicate that highest bulk density (3.18 gm/cc) was achieved at 1500 Kg/cm$^2$. No significant improvement was achieved beyond fabrication pressure of 1500 Kg/cm$^2$.

The main advantages are:

1. Relatively high densification of lime can be achieved by double calcination technique.

2. High densification and high resistance to hydration can be achieved by final calcination at the temperature range 1500° C. to 1650° C. with varying soaking time.

3. Additives help the improvement in grain size and hydration resistance without deteriorating the high temperature load bearing capacity.

4. The sintered lime prepared by the process of the present invention has the following properties:

(a) bulk density 3.05 to 3.23 gm/cc (b) hydration loss 50° C., 95% RH for 3 hours sieved through 36 BS mesh; and (c) grain size 47 to 155 micron.

We claim:

1. A process for the production of high density hydration resistant sintered lime which comprises washing limestone having impurities of less than 2% to remove external impurities, crushing the washed limestone to a size of 25 mm or below, calcining the limestone at a temperature in the range of 1000 to 1150° C. for a period in the range of 2 to 3 hours to form a calsin, hydrating the calcined mass, drying the hydrated mass deagglomerating the dried hydrated mass, mixing with the dried hydrated mass 1 to 4 weight percent of an additive which is selected from the group consisting of transition metal oxide capable of forming a low melting compound, rare earth metal oxide capable of forming a solid solution, and mixtures thereof, pelletizing the resultant mixture at a pressure of at least 1000 Kg/cm$^2$, sintering the pellets so obtained at a temperature in the range of 1500° C. to 1650° C. for a period in the range of 2–4 hours and allowing the resultant sintered pellets to cool.

2. A process as claimed in claim 1, wherein the sintered lime as prepared has the following properties:
(a) bulk density 3.05 to 3.23 gm/cc;
(b) hydration loss 50° C., 95% RH for 3 hours sieved through 36 BS mesh; and
(c) grain size 47–155 micron.

3. A process as claimed in claim 2, wherein the rare earth metal oxide used is selected from the group consisting of cerium oxide, lanthanum oxide and mixtures thereof.

4. A process as claimed in claim 1, wherein the transition metal oxide additive used is selected from the group consisting of ferric oxide, titanium dioxide, copper oxide, vanadium pentoxide and mixtures thereof.

5. A process as claimed in claim 1, wherein the rare earth metal oxide used is selected from the group consisting of cerium oxide, lanthanum oxide and mixtures thereof.

* * * * *